US008104083B1

(12) United States Patent
Sobel et al.

(10) Patent No.: US 8,104,083 B1
(45) Date of Patent: *Jan. 24, 2012

(54) VIRTUAL MACHINE FILE SYSTEM CONTENT PROTECTION SYSTEM AND METHOD

(75) Inventors: William E. Sobel, Jamul, CA (US); Bruce McCorkendale, Manhattan Beach, CA (US); Paul Agbabian, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 965 days.

This patent is subject to a terminal disclaimer.

(21) Appl. No.: 12/059,622

(22) Filed: Mar. 31, 2008

(51) Int. Cl.
*G06F 7/04* (2006.01)
*G06F 12/14* (2006.01)
*G06F 12/00* (2006.01)
*G06F 13/00* (2006.01)

(52) U.S. Cl. ....................................................... 726/17

(58) Field of Classification Search .................. None
See application file for complete search history.

(56) References Cited

U.S. PATENT DOCUMENTS

| | | | |
|---|---|---|---|
| 5,361,375 A * | 11/1994 | Ogi .................................. | 718/1 |
| 6,075,938 A * | 6/2000 | Bugnion et al. ................. | 703/27 |
| 2003/0088680 A1 | 5/2003 | Nachenberg et al. | |
| 2006/0021029 A1* | 1/2006 | Brickell et al. .................. | 726/22 |
| 2006/0136720 A1* | 6/2006 | Armstrong et al. ............ | 713/164 |
| 2006/0206658 A1* | 9/2006 | Hendel et al. ................... | 711/6 |
| 2007/0050767 A1* | 3/2007 | Grobman et al. ................ | 718/1 |
| 2007/0089111 A1* | 4/2007 | Robinson et al. ................ | 718/1 |
| 2007/0174897 A1* | 7/2007 | Rothman et al. ................ | 726/2 |
| 2007/0198243 A1* | 8/2007 | Leis et al. ....................... | 703/26 |
| 2007/0288228 A1* | 12/2007 | Taillefer et al. ................. | 703/28 |

OTHER PUBLICATIONS

McCorkendale et al., "Virtual Machine File System Restriction System and Method", U.S. Appl. No. 12/265,157, filed Nov. 5, 2008.
"BIOS", p. 1 [online]. Retrieved on Feb. 18, 2008 from the Internet: <URL:http://en.wikipedia.org/wiki/BIOS>. No author provided.
"Booting", pp. 1-8 [online]. Retrieved on Mar. 12, 2008 from the Internet: <URL:http://en.wikipedia.org/wiki/Booting>. No author provided.
"Device Node", pp. 1-3 [online]. Retrieved on Mar. 12, 2008 from the Internet: <URL:http://en.wikipedia.org/wiki/Block_device>. No author provided.
"File System", pp. 1-9 [online]. Retrieved on Mar. 12, 2008 from the Internet: <URL:http://en.wikipedia.org/wiki/File_system>. No author provided.
"Hypervisor", pp. 1-5 [online]. Retrieved on Mar. 12, 2008 from the Internet: <URL:http://en.wikipedia.org/wiki/Hypervisor>. No author provided.

(Continued)

*Primary Examiner* — Nathan Flynn
*Assistant Examiner* — Trang Doan
(74) *Attorney, Agent, or Firm* — Gunnison, McKay & Hodgson, L.L.P.; Serge J. Hodgson

(57) ABSTRACT

A method includes creating a first virtual machine comprising a remote file system. The method further includes causing all input/output from a second virtual machine to be redirected to the remote file system, the first virtual machine and the second virtual machine being on a single physical computer. The file system is securely protected from any malicious code executing on the second virtual machine by the hardware enforced partitioning between the first virtual machine and the second virtual machine.

13 Claims, 4 Drawing Sheets

OTHER PUBLICATIONS

"Network booting", p. 1 [online]. Retrieved on Mar. 12, 2008 from the Internet: <URL:http://en.wikipedia.org/wiki/Network_booting>. No author provided.

"Preboot Execution Environment", pp. 1-4 [online]. Retrieved on Mar. 12, 2008 from the Internet: <URL:http://en.wikipedia.org/wiki/Preboot_Execution_Environment>. No author provided.

"Preboot Execution Environment (PXE) Specification", Version 2.1, Sep. 20, 1999, Intel Corporation, pp. 1-101. No author provided.

"Single-instance storage", pp. 1-2 [online]. Retrieved on Mar. 18, 2008 from the Internet: <URL:http://en.wikipediea.org/wiki/Single_instance_storage>. No author provided.

"Uniform Naming Convention", p. 1 [online]. Retrieved on Feb. 18, 2008 from the Internet: <URL:http://en.wikipedia.org/wiki/Path_%28computing%29>. No author provided.

"Virtual machine", pp. 1-7 [online]. Retrieved on Mar. 12, 2008 from the Internet: <URL:http://en.wikipedia.org/wiki/Virtual_machine>. No author provided.

Sobel et al., U.S. Appl. No. 12/059,817, filed Mar. 31, 2008, entitled "Simulating PXE Booting for Virtualized Machines".

* cited by examiner

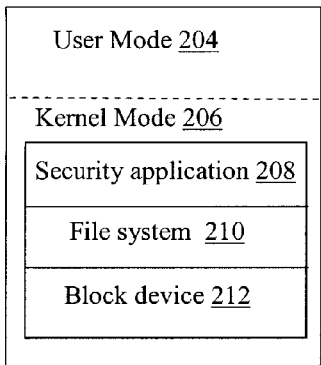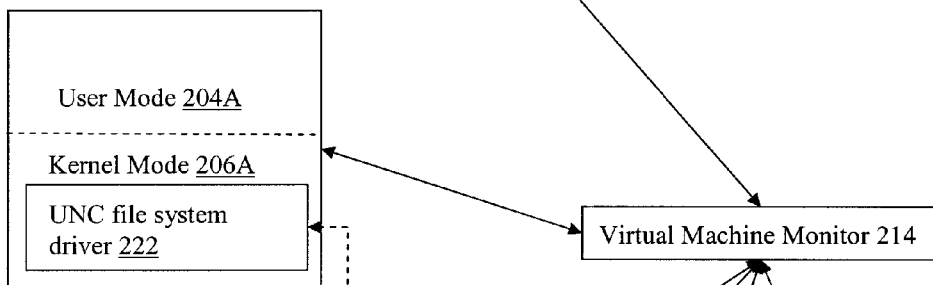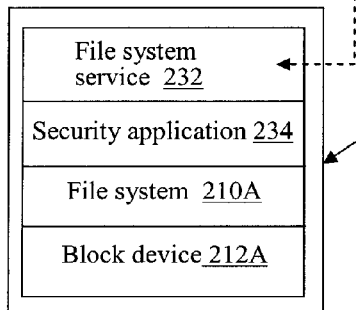
FIG. 2

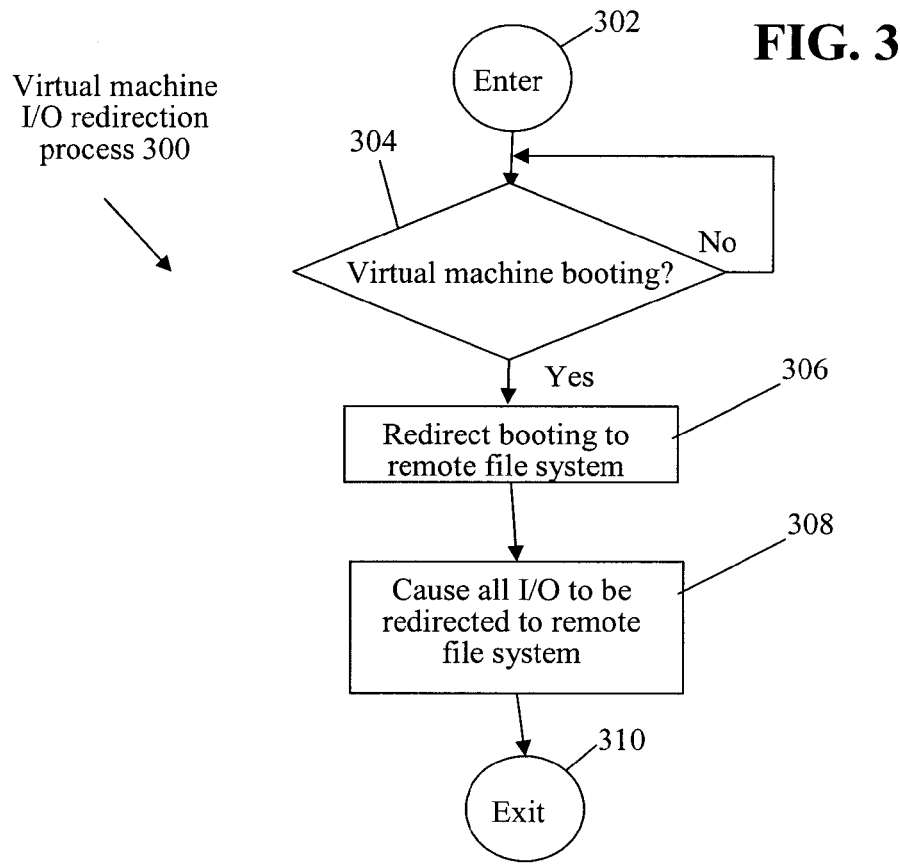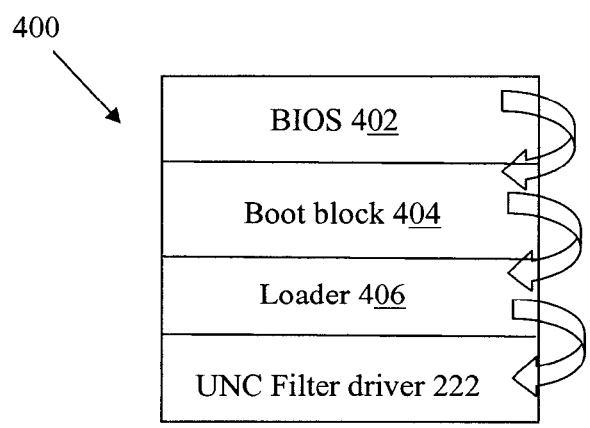

US 8,104,083 B1

VIRTUAL MACHINE FILE SYSTEM CONTENT PROTECTION SYSTEM AND METHOD

BACKGROUND

1. Field of the Invention

The present invention relates to computer system security. More particularly, the present invention relates to a system and method of providing security to virtual machines.

2. Description of the Related Art

A virtual machine (VM) is a software implementation of a computer that executes programs like a real physical computer. A system virtual machine provides a complete system platform which supports the execution of a complete operating system such as a Windows® operating system.

It is not uncommon to have several virtual machines running on a single real physical computer. Each of these virtual machines typically includes a security service, e.g., an anti-virus scanner, as does any real computer. However, providing a separate security service for each virtual machine is overhead intensive.

SUMMARY OF THE INVENTION

In accordance with one embodiment, a method includes creating a first virtual machine comprising a remote file system. The method further includes causing all input/output from a second virtual machine to be redirected to the remote file system, the first virtual machine and the second virtual machine being on a single physical computer.

The file system is securely protected from any malicious code executing on the second virtual machine by the hardware enforced partitioning between the first virtual machine and the second virtual machine.

More particularly, malicious code executing on the second virtual machine can at best attack, and possibly disable, the file system interface between the first virtual machine and the second virtual machine. However, in this event, the file system interface between the first virtual machine and the second virtual machine is disabled. As a result, the malicious code on the second virtual machine has lost all access to the remote file system, i.e., access to the remote file system is a fail closed model.

In yet another embodiment, the first virtual machine provides the remote file system for a plurality of virtual machines. A security application on the first virtual machine is provided for protecting the remote file system. In this manner, a single security application is provided for a plurality of virtual machines thus minimizing overhead as compared to providing each virtual machine with a security application.

Embodiments are best understood by reference to the following detailed description when read in conjunction with the accompanying drawings.

BRIEF DESCRIPTION OF THE DRAWINGS

FIG. 2 is a block diagram of a virtual machine architecture of FIG. 1 in accordance with one embodiment;

FIG. 3 is a flow diagram of a virtual machine input/output (I/O) redirection process in accordance with one embodiment;

FIG. 4 is a block diagram of a boot sequence used in a REDIRECT BOOTING TO REMOTE FILE SYSTEM OPERATION of the virtual machine I/O redirection process of FIG. 3 in accordance with one embodiment.

Common reference numerals are used throughout the drawings and detailed description to indicate like elements.

DETAILED DESCRIPTION

Figure 1:
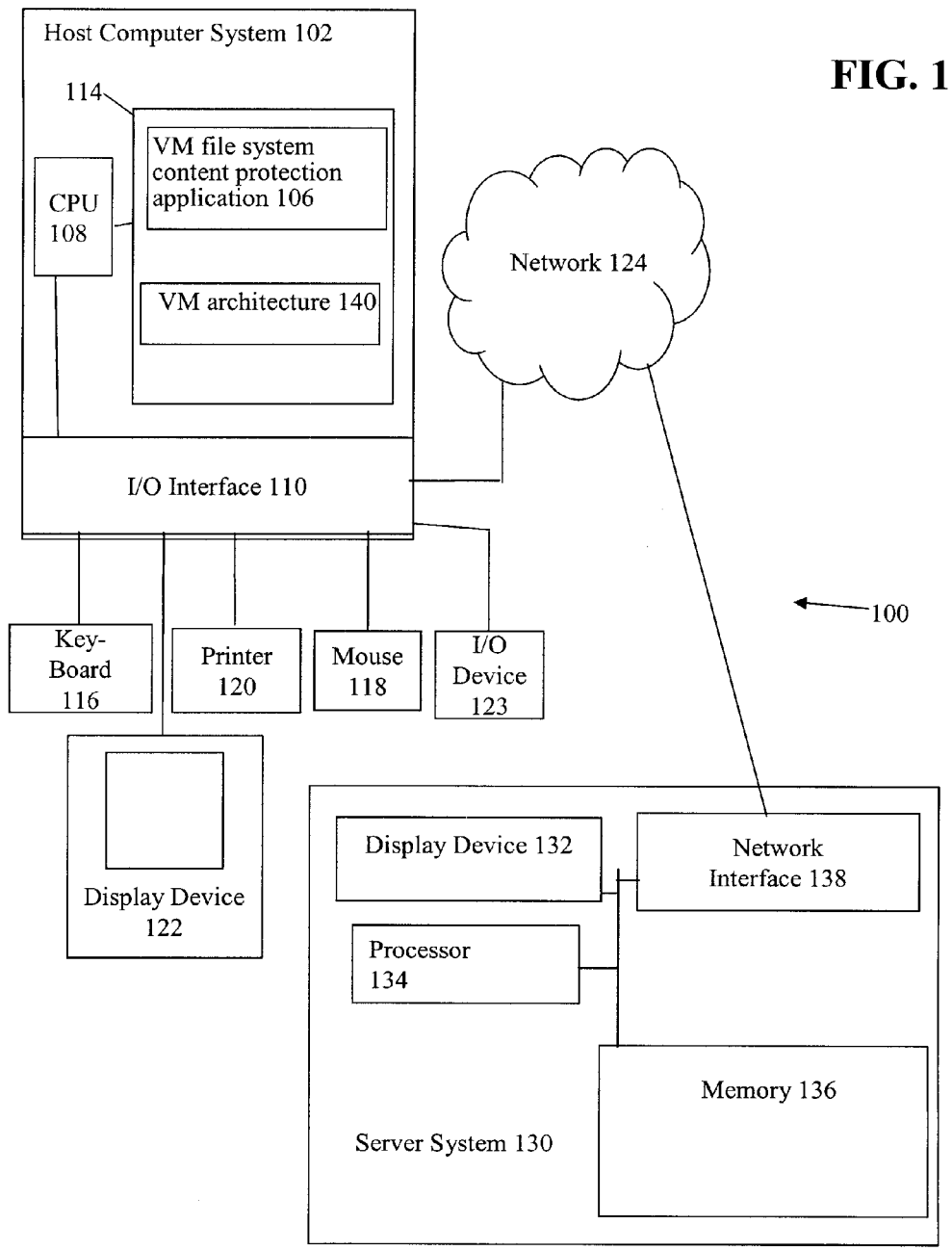
FIG. 1 is a diagram of a client-server system that includes a virtual machine file system content protection application executing on a host computer system in accordance with one embodiment.

In accordance with one embodiment, referring to FIGS. 1 and 2 together, a method includes creating a first virtual machine 230 comprising a remote file system 210A. The method further includes causing all input/output from a second virtual machine 220 to be redirected to remote file system 210A, first virtual machine 230 and second virtual machine 220 being on a single physical computer 102.

Remote file system 210A is securely protected from any malicious code executing on virtual machine 220 by the hardware enforced partitioning between virtual machine 220 and virtual machine 230. More particularly, malicious code executing on virtual machine 220 can at best attack, and possibly disable, a UNC file system driver 222 that facilitates a file system interface between virtual machine 220 and virtual machine 230. However, in this event, the file system interface between virtual machine 220 and virtual machine 230 is disabled. As a result, the malicious code on virtual machine 220 has lost all access to remote file system 210A, i.e., access to remote file system 210A is a fail closed model.

In yet another embodiment, virtual machine 230 provides remote file system 210A for a plurality of virtual machines (VM) 220A, 220B, ..., 220n. A security application 234 on virtual machine 230 is provided for protecting remote file system 210A. In this manner, a single security application 234 is provided for a plurality of virtual machines 220, 220A, 220B, ..., 220n thus minimizing overhead as compared to providing each virtual machine with a security application.

More particularly, FIG. 1 is a diagram of a client-server system 100 that includes a virtual machine file system content protection application 106 executing on a host computer system 102 in accordance with one embodiment. Host computer system 102, sometimes called a client or user device, typically includes a central processing unit (CPU) 108, hereinafter processor 108, an input output (I/O) interface 110, and a memory 114.

Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, virtual machine file system content protection application 106 is loaded into host computer system 102 via I/O device 123, such as from a CD, DVD or floppy disk containing virtual machine file system content protection application 106.

Host computer system 102 is coupled to a server system 130 of client-server system 100 by a network 124. Server system 130 typically includes a display device 132, a processor 134, a memory 136, and a network interface 138. Server system 130 may further include standard devices like a keyboard, a mouse, a printer, and an I/O device(s). The various hardware components of server system 130 are not illustrated to avoid detracting from the principles of this embodiment.

Network 124 can be any network or network system that is of interest to a user. In various embodiments, network interface 138 and I/O interface 110 include analog modems, digital modems, or a network interface card.

Virtual machine file system content protection application 106 is stored in memory 114 of host computer system 102 and executed on host computer system 102. The particular type of and configuration of host computer system 102 and server system 130, i.e., real physical computer systems, are not essential to this embodiment.

Further, host computer system 102 includes a virtual machine architecture 140 that includes at least one virtual machine, hereinafter referred to as virtual machines, and a virtual machine monitor that manages the virtual machines as described in greater detail below in reference to FIG. 2.

FIG. 2 is a block diagram of virtual machine architecture 140 of FIG. 1 in accordance with one embodiment. Referring now to FIG. 2, virtual machine architecture 140 includes virtual machines 202, 220, 230 and a virtual machine monitor 214.

Virtual machine (VM) 202, e.g., a system virtual machine, is a software implementation of a computer that executes programs like a real computer and provides a complete system platform which supports the execution of a complete operating system such as a Windows® operating system.

In one embodiment, virtual machine 202 includes a page based virtual memory system that uses pages, sometimes called memory areas. For example, Windows® operating systems provide page-based virtual memory management schemes that permit programs to realize a virtual memory address space. When the computer system processor is running in virtual memory mode, all addresses are assumed to be virtual addresses and are translated, or mapped, to physical addresses in main memory each time the processor executes a new instruction to access memory.

Conventionally, the virtual memory address space is divided into two parts: a lower user address space, also referred to as user mode address space or ring 3, available for use by a program; and, a high system address space, also referred to as kernel address space or ring 0, reserved for use by the operating system.

To protect the integrity of the operating system code and other kernel address space code and data structures from errant or malicious programs and to provide efficient system security (user rights management), Windows® operating systems separate code executing in the user address space, i.e., user mode, from code executing in the kernel address space, i.e., kernel mode. User mode code typically does not have direct access to kernel mode code and has restricted access to computer system resources and hardware.

To utilize kernel mode code functionalities, such as access to disk drives and network connections, user mode programs utilize system calls that interface between the user mode and kernel mode functions.

Accordingly, virtual machine 202 includes a user mode 204 and a kernel mode 206. Kernel mode 206 includes a security application 208, a file system 210, and a block device 212.

Security application 208 provides security for virtual machine 202. Illustratively, security application 208 includes an antivirus scanner for scanning code, e.g., files in file system 210, for malicious code. In one embodiment, malicious code is defined as any computer program, module, set of modules, or code that enters a computer system without an authorized user's knowledge and/or without an authorized user's consent.

File system 210 is a system for storing and organizing computer files and the data they contain to make it easy to find and access them. In one embodiment, file system 210 is designed for the storage of files on a data storage device, such as a hard disk drive of host computer system 102. In one embodiment, file system 210 is a New Technology File System (NTFS) file system although other file systems can be used.

File system 210 utilizes block device 212. Block device 212 handles reading and writing of blocks of data, e.g., to the hard disk drive or other storage medium of host computer system 102, as directed by file system 210.

Generally, security application 208 resides between file system 210 and programs on virtual machine 202, e.g., user mode programs in user mode 204 and drivers in kernel mode 206, that access file system 210. In this manner, security application 208 intercepts file system exchanges with file system 210, evaluates the file system exchanges to determine whether they are legitimate or malicious, and takes appropriate action, e.g., allows a valid file system exchange and takes protective action when a file system exchange is malicious.

However, security application 208 is susceptible to deception by malicious code executing on virtual machine 202. More particularly, if the malicious code has the same or greater privileges than security application 208, it is possible for the malicious code to circumvent security application 208 to directly access file system 210.

Virtual machine 202 is similar to a conventional virtual machine and is set forth herein to illustrate how security application 208 within virtual machine 202 can be circumvented by malicious code. Further, a plurality of virtual machines 202 executing simultaneously on host computer system 102 would each require a security application 208 and thus would be overhead intensive. Accordingly, although virtual machine architecture 140 includes virtual machine 202 for the purpose of illustrating a conventional virtual machine structure and the deficiencies thereof, in other embodiments, virtual machine architecture 140 would not include virtual machine 202.

Virtual machine architecture 140 further includes virtual machines 220, 230 in accordance with one embodiment. Virtual machine 220 includes a user mode 204A and a kernel mode 206A in a manner similar to user mode 204 and kernel mode 206 of virtual machine 202 as described above, the discussion of which is herein incorporated by reference. However, in accordance with this embodiment, kernel mode 206A includes a Uniform Naming Convention (UNC) file system driver 222, sometimes called a redirector, the function of which is discussed in detail below.

Virtual machine 230 includes a file system service 232, a security application 234, a file system 210A, and a block device 212A. Security application 234 provides security for virtual machine 230. Illustratively, security application 234 includes an antivirus scanner for scanning code, e.g., files in file system 210A, for malicious code, or autoprotect function for protecting file system 210A, e.g., rolling back the state of file system 210A.

File system 210A, sometimes called a remote file system, is a system for storing and organizing computer files and the data they contain to make it easy to find and access them. In one embodiment, file system 210A is designed for the storage of files on a data storage device, such as a hard disk drive of host computer system 102. In one embodiment, file system 210A is a NTFS file system although is another file system in another embodiment.

File system 210A utilizes block device 212A. Block device 212A handles reading and writing of blocks of data, e.g., to the hard disk drive or other storage medium of host computer system 102 as directed by file system 210A.

Virtual machine 230, sometimes called a security partition, is a remote file system for virtual machine 220. More particularly, UNC file system driver 222 and file system service 232 provide a file system interface for remote access of virtual machine 230 from virtual machine 220, e.g., an operating system executing in virtual machine 220, and files of file system 210A of virtual machine 230. Although various actions are described for virtual machines, in light of this disclosure, those of skill in the art will understand that the actions are for operating systems executing on the virtual machines. Illustratively, virtual machine 220 and/or virtual machine 230 is a virtualization of a Windows® based server.

Generally, file system service 232, sometimes called a shim, is a complimentary interface to UNC file system driver 222, i.e., works in conjunction with UNC file system driver 222 to provide a file system interface for remote access of virtual machine 230 from virtual machine 220.

To illustrate, virtual machine monitor 214, sometimes called a virtual machine manager, or VMM, is a virtualization platform that allows multiple virtual machines such as virtual machines 202, 220, 230 to run on host computer system 102 at the same time. Virtual machine monitors similar to virtual machine monitor 214 are well known to those of skill in the art and only the relevant functionality of virtual machine monitor 214 is described herein.

Typically, there is a specific distinction between a virtual machine monitor and a hypervisor. The hypervisor handles only the basic virtualization of the lowest level machine resources, such as the memory management unit (MMU), CPU privilege level states, and dispatching of "Hyper-Calls". In contrast, the virtual machine monitor handles the higher level support of virtual machines such as provisioning the virtual machines, e.g., creating, starting, and stopping the virtual machines, scheduling virtual machine time slices and priorities, virtualizing devices, servicing Hyper-Call requests dispatched by the hypervisor, and so forth. Further, the functions of the hypervisor and virtual machine monitor can be combined into a monolithic hypervisor. Accordingly, although virtual machine monitor 214 is set forth as having specific functions herein, in light of this disclosure, it is to be understood that virtual machine monitor 214 can also support functions of a hypervisor and/or a monolithic hypervisor in other embodiments.

Virtual machine monitor 214 has a higher privilege level than virtual machines 202, 220, 230 allowing virtual machine monitor 214 to manage virtual machines 202, 220, 230. More particularly, any interactions between virtual machines 202, 220, 230 are through, or authorized by, virtual machine monitor 214. The requirement that any interaction between virtual machines 202, 220, 230 occur through, or with permission from, virtual machine monitor 214 is enforced in hardware, e.g., by processor 108, and thus is a very secure requirement.

Virtual machine 220 thus must remotely access file system 210A, e.g., through a Common Internet File System (CIFS) interface or a Network File System (NFS) interface. All file system requests from virtual machine 220 must be funneled through the remote file system interface provided by UNC file system driver 222 and file system service 232.

In one embodiment, the remote file system interface can use shared memory, which is very fast, as the remote file system interface is on a single physical computer 102. In other embodiments, the remote file system interface uses a network interface, a paravirtualizaton/enlightenment technique, and/or a hypercall technique or combinations thereof. In yet another embodiment, hardware can assist or accelerate the transfer of data.

In one embodiment, UNC file system driver 222 uses a common syntax to describe the location of resources, e.g., files, within file system 210A. Illustratively, the UNC syntax used is \\computername\sharedfolder\resource, wherein computername is the name of virtual machine 230, sharedfolder is a folder within file system 210A, and resource is the particular file desired. Although one syntax is set forth, any uniform naming convention to identify resources can be used.

More generally, UNC file system driver 222 packages file system requests from virtual machine 220 to form a packaged file system request according to the communication protocol used. UNC file system driver 222 sends the packaged file system request. The packaged file system request is received by virtual machine monitor 214, which forwards the packaged file system request to virtual machine 230, if allowed.

Upon receipt by virtual machine 230, the packaged file system request is unpackaged by file system service 232. The unpackaged file system request is passed to security application 234, which in turn, passes the unpackaged file system request to file system 210A, if allowed. Alternatively, the unpackaged file system request is passed directly to file system 210A depending upon the particular file system request.

File system 210A returns the file system request result to security application 234, which in turn, passes the file system request result to file system service 232, if allowed. Alternatively, the file system request result is passed directly to file system service 232 depending upon the particular file system request result.

File system service 232 packages the file system request results from virtual machine 230 to form a packaged file system request result according to the communication protocol used. File system service 232 sends the packaged file system request result.

The packaged file system request result is received by virtual machine monitor 214, which returns the packaged file system request result to virtual machine 220, if allowed.

Upon receipt by virtual machine 220, the packaged file system request result is unpackaged by UNC file system driver 222. The unpackaged file system request result is passed to the operating system of virtual machine 220.

Although file system requests and the related replies (results), e.g., file system exchanges, are set forth above as passing through virtual machine monitor 214, in another embodiment, virtual machine monitor 214 authorizes direct communication between virtual machine 220 and 230 as indicated by the dashed connector arrow. Illustratively, the communication is directly between UNC file system driver 222 and file system service 232.

Illustratively, virtual machine 230 is similar to a UNC file server for purposes of how virtual machine 220 interacts with virtual machine 230 in one example.

Generally, security application 234 resides between file system 210A and file system service 232. In this manner, security application 234 intercepts file system exchanges with file system 210A, evaluates the file system exchanges to determine whether they are legitimate or malicious, and takes appropriate action, e.g., allows a valid file system exchange and takes protective action when a file system exchange is malicious.

Further, file system 210A is securely protected from any malicious code executing on virtual machine 220 by the hardware enforced partitioning between virtual machine 220 and virtual machine 230. More particularly, malicious code executing on virtual machine 220 can at best attack, and possibly disable, UNC file system driver 222. However, in this event, the file system interface between virtual machine 220 and virtual machine 230 is disabled. As a result, the malicious code on virtual machine 220 has lost all access to file system 210A, i.e., access to file system 210A is a fail closed model. This is in contrast to malicious code on virtual machine 202, which can gain access to the entire file system 210 should security application 208 be defeated or disabled, as discussed above, which is an example of a fail open model for access to file system 210.

More particularly, security application 234 is insinuated at the chokepoint provided by virtual machine 230 to changes to file system 210A. This allows security application 234 to inspect changes to file system 210A from the shared and controlled environment of virtual machine 230 and remain immune and insulated from the effects of any malicious code, e.g., rootkits, on virtual machine 220.

In one embodiment, file system 210A is mapped directly for virtual machine 220. In another embodiment, a read-only base with copy on write capabilities is provided.

In yet another embodiment, virtual machine 230 provides remote file system 210A for a plurality of virtual machines 220A, 220B, ..., 220n of virtual machine architecture 140. Each of virtual machines 220A, 220B, 220n are similar to virtual machine 220 and include a UNC file system driver 222. In this manner, a single security application 234 is provided for a plurality of virtual machines 220, 220A, 220B, ..., 220n thus minimizing overhead as compared to providing each virtual machine with a security application.

Further, by providing a remote file system 210A for virtual machines 220A, 220B, ..., 220n, virtual machine 230 provides a single-instance storage capability in one embodiment. A single-instance storage capability is the capability of remote file system 210A to keep one copy of content for virtual machines 220A, 220B, ..., 220n. This increases efficiency as compared to each virtual machine 220A, 220B, ..., 220n storing a separate copy of the content.

In one particular embodiment, remote file system 210A is shared by virtual machines 220A, 220B, ..., 220n with changes stored for each virtual machine 220A, 220B, ..., 220n. For example, a "test version" of an environment can be booted and all writes go to remote file system 210A and can be sandboxed and later deleted. In another embodiment, virtual machines 220A, 220B, 220n boot from the same master files in remote file system 210A with changes, such as registry and users settings, being persistently stored and returned as needed.

In yet another embodiment, instead of being within virtual machine 230, security application 234 is within another virtual machine, herein referred to as a security application virtual machine, separate from virtual machines 220, 230. File system requests from virtual machine 220 are routed to the security application virtual machine, and, if allowed, from the security application virtual machine to virtual machine 230 and vice versa. In yet another embodiment, various functionality of virtual machine 230 are incorporated directly into virtual machine monitor 214.

FIG. 3 is a flow diagram of a virtual machine input/output (I/O) redirection process 300 in accordance with one embodiment. Referring now to FIGS. 1, 2 and 3 together, execution of virtual machine file system content protection application 106 by processor 108 results in the operations of virtual machine I/O redirection process 300 as described below in one embodiment.

From an ENTER OPERATION 302, flow moves to a VIRTUAL MACHINE BOOTING CHECK OPERATION 304. In VIRTUAL MACHINE BOOTING CHECK OPERATION 304, a determination is made as to whether a virtual machine is booting. As is well known to those of skill in the art, booting is a bootstrapping process that starts the operating system of the virtual machine when the virtual machine is created.

If a virtual machine is not booting, flow remains a VIRTUAL MACHINE BOOTING CHECK OPERATION 304. Conversely, if a virtual machine is booting, flow moves from VIRTUAL MACHINE BOOTING CHECK OPERATION 304 to a REDIRECT BOOTING TO REMOTE FILE SYSTEM OPERATION 306.

For purposes of illustration, assume the case where virtual machine 220 is booting and virtual machine 230 includes remote file system 210A for virtual machine 220 as described above. In one embodiment, virtual machine 230, sometimes called a first virtual machine, is created prior to booting of any virtual machine that will use remote file system 210A. In another embodiment, upon a determination that virtual machine 220, sometimes called a second virtual machine, is booting, virtual machine 230 is created.

In REDIRECT BOOTING TO REMOTE FILE SYSTEM OPERATION 306, booting of the virtual machine is redirected to the remote file system. In one embodiment, a protocol similar to a network booting protocol is used to redirect the booting to the remote file system. As is well known to those of skill in the art, network booting is the process of booting a computer from a network rather than a local drive. In accordance with this embodiment, instead of loading the boot block across a network, the boot block is loaded from virtual machine 230.

Illustratively, virtual machine 220 includes a version of Windows® that can boot entirely from a network, such as, for example, network booting versions of Windows® Server or Vista Enterprise. However, instead of booting across a network, booting is redirected to a boot block in virtual machine 230.

In one particular embodiment, an environment similar to a Preboot eXecution Environment (PXE, also known as Pre-Execution Environment or "pixie") is used to boot virtual machine 220 from virtual machine 230. PXE is an environment to boot computers using a network interface independent of the available data storage devices like hard disks, i.e., network booting. See for example, Sobel et al., co-filed and commonly assigned U.S. patent application Ser. No. entitled "SIMULATING PXE BOOTING FOR VIRTUALIZED MACHINES", which is herein incorporated by reference in its entirety.

FIG. 4 is a block diagram of a boot sequence 400 used in REDIRECT BOOTING TO REMOTE FILE SYSTEM OPERATION 306 of virtual machine I/O redirection process 300 of FIG. 3 in accordance with one embodiment. Referring now to FIGS. 1, 2, 3 and 4 together, boot sequence 400 initially includes loading of a BIOS (Basic Input/Output System) 402 of virtual machine 220. The primary function of BIOS 402 is to identify and initiate, i.e., load and transfer control to, a boot block 404, sometimes called a boot sector. Illustratively, boot block 404 is located within remote file system 210A of virtual machine 230 although could be located within virtual machine monitor 214 or elsewhere.

Boot block 404, e.g., boot files therein, in turn identifies and initiates a loader 406. Loader 406 loads the operating system of the virtual machine 220 including UNC file system driver 222. Accordingly, from REDIRECT BOOTING TO REMOTE FILE SYSTEM OPERATION 306, flow moves to a CAUSE ALL INPUT/OUTPUT (I/O) TO BE REDIRECTED TO REMOTE FILE SYSTEM OPERATION 308 where all input/output of virtual machine 220 is redirected to virtual machine 230 by UNC file system driver 222. From CAUSE ALL I/O TO BE REDIRECTED TO REMOTE FILE SYSTEM OPERATION 308, flow moves to and exits at EXIT OPERATION 310.

In another embodiment, in addition to BIOS 402, one or more of the functions of boot block 404, loader 406 and UNC file system driver 222 can be installed into virtual machine 220 at boot time. However, this involves more modification to the boot sequence of virtual machine 220, which may be undesirable depending upon the particular virtual machine and ability to modify the same.

Figure 5:
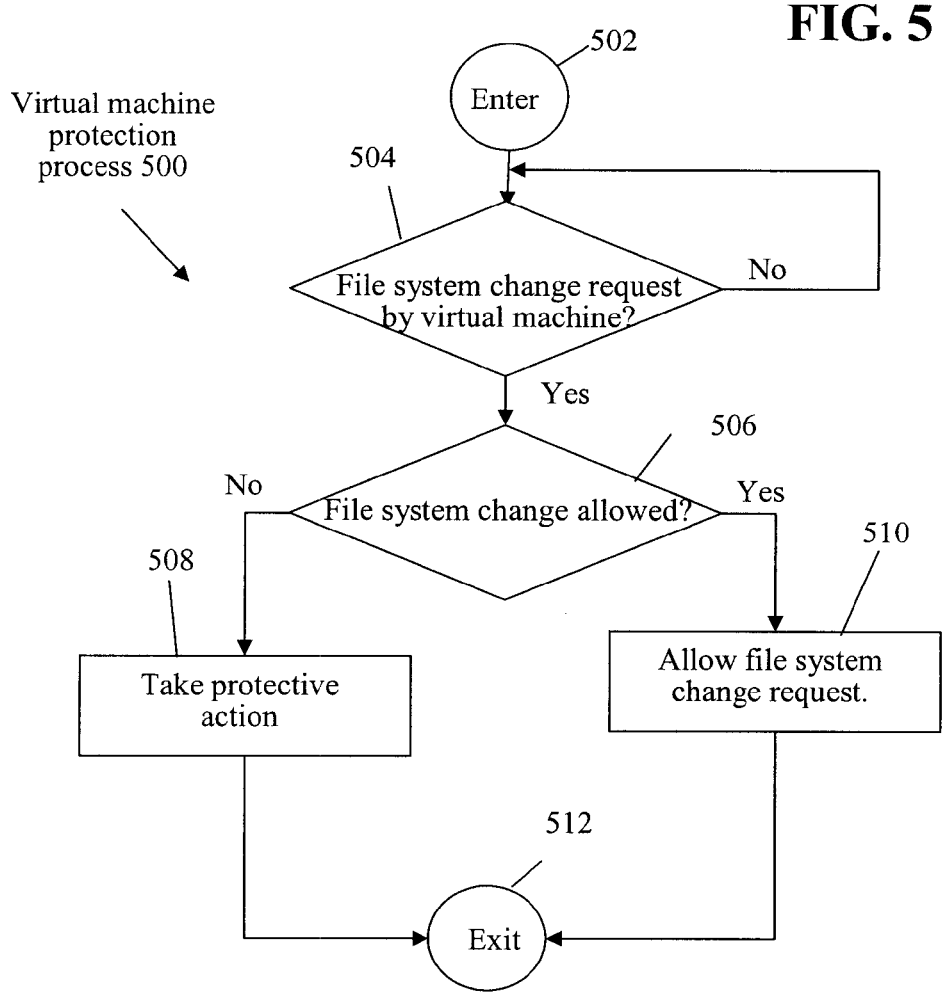
FIG. 5 is a flow diagram of a virtual machine protection process in accordance with one embodiment.

FIG. 5 is a flow diagram of a virtual machine protection process 500 in accordance with one embodiment. Referring now to FIGS. 1, 2 and 5 together, execution of virtual machine file system content protection application 106 by processor 108 results in the operations of virtual machine protection process 500 as described below in one embodiment.

From an ENTER OPERATION 502, flow moves to a FILE SYSTEM CHANGE REQUEST BY VIRTUAL MACHINE CHECK OPERATION 504. In FILE SYSTEM CHANGE REQUEST BY VIRTUAL MACHINE CHECK OPERATION 504, a determination is made as to whether a virtual machine has requested a file system change, i.e., made a file system change request. If a file system change request has not been made, flow remains at FILE SYSTEM CHANGE REQUEST BY VIRTUAL MACHINE CHECK OPERATION 504. Conversely, if a file system change request has been made, flow moves to a FILE SYSTEM CHANGE ALLOWED CHECK OPERATION 506.

Illustratively, virtual machine 220 requests a change of file system 210A on virtual machine 230. This file system change request is intercepted by security application 234.

In FILE SYSTEM CHANGE ALLOWED CHECK OPERATION 506, a determination is made as to whether the requested file system change is allowed or not. If the requested file system change is allowed, i.e., is determined not to be malicious, flow moves from FILE SYSTEM CHANGE ALLOWED CHECK OPERATION 506 to an ALLOW FILE SYSTEM CHANGE REQUEST OPERATION 510. In ALLOW FILE SYSTEM CHANGE REQUEST OPERATION 510, the file system change request is allowed, i.e., passed to file system 210A. From ALLOW FILE SYSTEM CHANGE REQUEST OPERATION 510, flow moves to and exits at an EXIT OPERATION 512 or returns to FILE SYSTEM CHANGE REQUEST BY VIRTUAL MACHINE CHECK OPERATION 504 and awaits the next file system change request.

Conversely, if the requested file system change is not allowed, i.e., is determined to be malicious, flow moves from FILE SYSTEM CHANGE ALLOWED CHECK OPERATION 506 to a TAKE PROTECTIVE ACTION OPERATION 508. In TAKE PROTECTIVE ACTION OPERATION 508, protective action is taken, e.g., the file system change request is not allowed or other protective action taken. In another embodiment, in TAKE PROTECTIVE ACTION OPERATION 508, the file system change is allowed to occur, but the old file system state is saved, allowing reversion back to the old file system state and thus to a known good condition at will.

In one particular example, assume the case where the file system change request is to create a new file and write data to the created new file. The data is scanned by security application 234 and determined to be malicious in FILE SYSTEM CHANGE ALLOWED CHECK OPERATION 506. Accordingly, the new file is not created in TAKE PROTECTIVE ACTION OPERATION 508 preventing the malicious code from being written to file system 210A.

Referring again to FIG. 1, virtual machine file system content protection application 106 is in computer memory 114. As used herein, a computer memory refers to a volatile memory, a non-volatile memory, or a combination of the two.

Although virtual machine file system content protection application 106 is referred to as an application, this is illustrative only. Virtual machine file system content protection application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments have been described for a client-server configuration, an embodiment may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a tangible storage medium configured to store or transport computer readable code in accordance with an embodiment. Some examples of computer program products are CD-ROM discs, DVDs, ROM cards, floppy discs, magnetic tapes, computer hard drives, and servers on a network.

As illustrated in FIG. 1, this medium may belong to the computer system itself. However, the medium also may be removed from the computer system. For example, virtual machine file system content protection application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the virtual machine file system content protection functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the virtual machine file system content protection functionality in accordance with one embodiment can be implemented in a wide variety of computer system configurations. In addition, the virtual machine file system content protection functionality could be stored as different modules in memories of different devices.

For example, virtual machine file system content protection application 106 could initially be stored in server system 130, and then as necessary, a portion of virtual machine file system content protection application 106 could be transferred to host computer system 102 and executed on host computer system 102. Consequently, part of the virtual machine file system content protection functionality would be executed on processor 134 of server system 130, and another part would be executed on processor 108 of host computer system 102. In view of this disclosure, those of skill in the art can implement various embodiments in a wide-variety of physical hardware configurations using an operating system and computer programming language of interest to the user.

In yet another embodiment, virtual machine file system content protection application 106 is stored in memory 136 of server system 130. Virtual machine file system content protection application 106 is transferred over network 124 to memory 114 in host computer system 102. In this embodiment, network interface 138 and I/O interface 110 would include analog modems, digital modems, or a network interface card. If modems are used, network 124 includes a communications network, and virtual machine file system content protection application 106 is downloaded via the communications network.

This disclosure provides exemplary embodiments. The scope is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
   creating a first virtual machine comprising:
   a remote file system;
   a file system service;
   a security application residing between said remote file system and said file system service for intercepting and evaluating file system exchanges with said remote file system;
   a block device for reading and writing of blocks of data as directed by said remote file system; and
   causing all input/output from a second virtual machine to be redirected to said remote file system, wherein said second virtual machine comprises a user mode and a kernel mode, said kernel mode comprising a Uniform Naming Convention (UNC) file system driver for redirecting said input/output to said remote file system, wherein said UNC file system driver uses a common syntax to describe the location of resources within said remote file system, wherein said UNC file system driver and said file system service provide a file system interface for remote access of said first virtual machine from said second virtual machine, said first virtual machine and said second virtual machine being on a single physical computer.

2. The computer-implemented method of claim 1 wherein a virtual machine architecture comprises said first virtual machine and said second virtual machine.

3. The computer-implemented method of claim 2 wherein said virtual machine architecture further comprises a virtual machine monitor that manages said first virtual machine and said second virtual machine.

4. The computer-implemented method of claim 3 wherein any interactions between said first virtual machine and said second virtual machine are through said virtual machine monitor.

5. The computer-implemented method of claim 3 wherein any interactions between said first virtual machine and said second virtual machine are authorized by said virtual machine monitor.

6. The computer-implemented method of claim 1 wherein said second virtual machine is a system virtual machine.

7. The computer-implemented method of claim 1 wherein said security application is for:

determining that a file system change request for a file system change of said remote file system has been made by said second virtual machine;
determining whether said file system change is allowed,
wherein upon determining that said file system change is allowed, said method further comprising allowing said file system change request; and
wherein upon determining that said file system change is not allowed, said method further comprising taking protective action.

8. The computer-implemented method of claim 1 wherein partitioning between said first virtual machine and said second virtual machine is hardware enforced.

9. The computer-implemented method of claim 1 wherein said first virtual machine provides said remote file system for a plurality of virtual machines.

10. The computer-implemented method of claim 1 further comprising redirecting booting of said second virtual machine to said remote file system.

11. The computer-implemented method of claim 10 wherein said booting comprises a boot sequence of loading a BIOS, said BIOS loading and transferring control to a boot block located within said remote file system.

12. A computer system comprising:
   a memory having stored therein a virtual machine file system content protection application; and
   a processor coupled to said memory, wherein execution of said virtual machine file system content protection application generates a method comprising:
   creating a first virtual machine comprising:
   a remote file system;
   a file system service;
   a security application residing between said remote file system and said file system service for intercepting and evaluating file system exchanges with said remote file system;
   a block device for reading and writing of blocks of data as directed by said remote file system; and
   causing all input/output from a second virtual machine to be redirected to said remote file system, wherein said second virtual machine comprises a user mode and a kernel mode, said kernel mode comprising a Uniform Naming Convention (UNC) file system driver for redirecting said input/output to said remote file system, wherein said UNC file system driver uses a common syntax to describe the location of resources within said remote file system, wherein said UNC file system driver and said file system service provide a file system interface for remote access of said first virtual machine from said second virtual machine, said first virtual machine and said second virtual machine being on a single physical computer.

13. A computer-program product comprising a non-transitory computer readable storage medium containing computer program code comprising:
   a virtual machine file system content protection application for creating a first virtual machine comprising:
   a remote file system;
   a file system service;
   a security application residing between said remote file system and said file system service for intercepting and evaluating file system exchanges with said remote file system;
   a block device for reading and writing of blocks of data as directed by said remote file system; and
   said virtual machine file system content protection application further for causing all input/output from a second virtual machine to be redirected to said remote file system, wherein said second virtual machine comprises a user mode and a kernel mode, said kernel mode comprising a Uniform Naming Convention (UNC) file system driver for redirecting said input/output to said remote file system, wherein said UNC file system driver uses a common syntax to describe the location of resources within said remote file system, wherein said UNC file system driver and said file system service provide a file system interface for remote access of said first virtual machine from said second virtual machine, said first virtual machine and said second virtual machine being on a single physical computer.

* * * * *